United States Patent
Kobayashi

(10) Patent No.: US 9,897,774 B2
(45) Date of Patent: Feb. 20, 2018

(54) LENS UNIT AND IMAGING DEVICE

(71) Applicant: FUJIFILM Corporation, Tokyo (JP)

(72) Inventor: Hideo Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 299 days.

(21) Appl. No.: 14/974,864

(22) Filed: Dec. 18, 2015

(65) Prior Publication Data

US 2016/0103297 A1 Apr. 14, 2016

Related U.S. Application Data

(63) Continuation of application No. PCT/JP2014/061956, filed on Apr. 30, 2014.

(30) Foreign Application Priority Data

Jun. 26, 2013 (JP) ................. 2013-133846

(51) Int. Cl.

| | |
|---|---|
| G02B 7/02 | (2006.01) |
| G02B 7/09 | (2006.01) |
| G02B 7/08 | (2006.01) |
| G03B 13/36 | (2006.01) |
| G03B 3/10 | (2006.01) |

(52) U.S. Cl.
CPC ............. *G02B 7/09* (2013.01); *G02B 7/08* (2013.01); *G03B 3/10* (2013.01); *G03B 13/36* (2013.01); *G03B 2205/0046* (2013.01); *G03B 2205/0069* (2013.01)

(58) Field of Classification Search
CPC . G02B 7/08; G02B 7/04; G02B 7/023; G02B 7/102; G02B 7/09; G02B 7/10; G02B 13/001; G02B 13/009; G03B 3/10; G03B 5/00; G03B 13/34; G03B 13/36; G03B 2205/0069; G03B 2205/0053; G03B 2205/0015; G03B 2205/0046
USPC .................. 359/694–706, 822–826
See application file for complete search history.

(56) References Cited

U.S. PATENT DOCUMENTS

2010/0220402 A1 9/2010 Santo et al.

FOREIGN PATENT DOCUMENTS

JP 2010-224526 A 10/2010

OTHER PUBLICATIONS

International Search Report issued in PCT/JP2014/061956 dated Jul. 29, 2014.

(Continued)

*Primary Examiner* — Mahidere Sahle
(74) *Attorney, Agent, or Firm* — Birch, Stewart, Kolasch & Birch, LLP

(57) ABSTRACT

First and second lens drive sections of the lens unit are disposed at positions where a center point connecting line, which connects center positions of the lens drive sections on a plane perpendicular to a lens axis, does not pass through the lens axis; and include yokes, voice coils, and plate-like magnets. The width of the magnet in a lens circumferential direction is smaller than the width of the yoke; and the magnets are disposed to be biased to end portions of the yokes, which are positioned in a divided area in which a lens axis center is present, of divided areas divided into two by a center point connecting line, in the lens circumferential direction, respectively. The shortest distance between an operating point connecting line is shorter than the shortest distance between the center point connecting line and the lens axis.

20 Claims, 9 Drawing Sheets

(56) References Cited

OTHER PUBLICATIONS

Written Opinion of the International Searching Authority issued in PCT/JP2014/061956 dated Jul. 29, 2014.
English translation of International Preliminay Report on Patentability issued in PCT/JP2014/061956 dated Dec. 29, 2015.

LENS UNIT AND IMAGING DEVICE

CROSS-REFERENCE TO RELATED APPLICATIONS

This application is a Continuation of PCT International Application No. PCT/JP2014/061956 filed on Apr. 30, 2014, which claims priority under 35 U.S.C §119(a) to Japanese Patent Application No. 2013-133846 filed Jun. 26, 2013. Each of the above application(s) is hereby expressly incorporated by reference, in its entirety, into the present application.

BACKGROUND OF THE INVENTION

1. Field of the Invention

The present invention relates to a lens unit and an imaging device.

2. Description of the Related Art

A lens unit with an auto-focus function, which is mounted on an imaging device such as a digital camera or a video camera, includes a drive section for focus drive. The drive section for focus drive focuses an optical image on the light-receiving surface of an imaging element by moving a focus lens in a direction of an optical axis. A lens barrel, which is formed using a voice coil motor as the drive section, is disclosed in JP2010-224526A.

SUMMARY OF THE INVENTION

The lens barrel disclosed in JP2010-224526A includes a support frame having a double structure that includes a first frame provided on the inside and a second frame provided on the outside. A plurality of cam grooves are formed in the second frame provided on the outside, and a plurality of cam pins to be inserted into the cam grooves of the second frame are provided on the outer periphery of the first frame provided on the inside. The first frame is provided with a voice coil motor as a drive section for focus drive, and the focus lens is supported by the first frame so as to be movable in a direction of the lens axis through the drive section. When the second frame is rotated about the lens axis, the second frame moves the first frame along a straight line in the direction of the lens axis by the action of the cam grooves and the cam pins. Accordingly, the relative positions of the lenses, which are supported by the first and second frames, in the direction of the lens axis are changed.

Incidentally, when a plurality of drive sections for focus drive are mounted on the support frame to increase a driving force for the movement of the lenses, the lens barrel increases in size in the direction of the lens axis or a radial direction in a certain disposition relationship between the drive sections and peripheral members, such as the cam pins. Accordingly, the drive sections and the cam pins are disposed at different positions not overlapping each other when viewed in the direction of the lens axis so that an increase in the size of the lens barrel disclosed in JP2010-224526A is suppressed.

Accordingly, when the drive sections are disposed so as to avoid the cam pins, the centroid position of the first frame deviates from a lens axis center. As a result, since the balance of the weight of the first frame having a center on the lens axis is lost, there is a disadvantage that thrust generated by the drive sections cannot be efficiently transmitted to the focus lens. This is not limited to the driving of the focus lens, and is the same even in the case of the driving of other lenses, such as a zoom lens and a lens for image stabilization.

Accordingly, an object of the invention is to provide a lens unit and an imaging device that can appropriately maintain the balance of thrust applied by drive sections regardless of the positions of the drive sections.

The invention includes the following structure.

(1) A lens unit including:
a lens;
a lens holder that holds the lens;
a support frame that is provided on an outer periphery of the lens holder and supports the lens holder so as to allow the lens holder to be moved along an optical axis of the lens; and
first and second lens drive sections that move the lens holder along the lens axis in the support frame,
wherein the first and second lens drive sections are disposed at positions where a center point connecting line, which connects center positions of the first and second lens drive sections positioned on a plane perpendicular to the lens axis, does not pass through the lens axis,
each of the first and second lens drive sections includes a voice coil motor that includes a yoke fixed to one of the lens holder and the support frame, a voice coil fixed to the other thereof and facing the yoke, and a plate-like magnet fixed to a surface of the yoke facing the voice coil,
the width of the magnet in a lens circumferential direction on the plane perpendicular to the lens axis is smaller than the width of the yoke in the lens circumferential direction,
the magnets are disposed to be biased to end portions of the yokes, which are positioned in a divided area in which the lens axis center is present of divided areas divided into two from the plane perpendicular to the lens axis by the center point connecting line, in the lens circumferential direction, respectively, and
the shortest distance between an operating point connecting line, which connects the center position of the magnet of the first lens drive section to the center position of the magnet of the second lens drive section, and the lens axis on the plane perpendicular to the lens axis is shorter than the shortest distance between the center point connecting line and the lens axis.

(2) An imaging device including:
the lens unit according to (1); and
an imaging element that picks up an optical image through the lens.

According to the invention, it is possible to appropriately maintain the balance of thrust applied to a lens by drive sections regardless of the positions of the drive sections. Accordingly, it is possible to transmit thrust to the lens with a high efficiency without the increase of the size of the lens unit.

DESCRIPTION OF THE PREFERRED EMBODIMENTS

An embodiment of the invention will be described below in detail with reference to the drawings.

Meanwhile, the configuration of a digital camera will be described here as an aspect of an imaging device.

Figure 1:
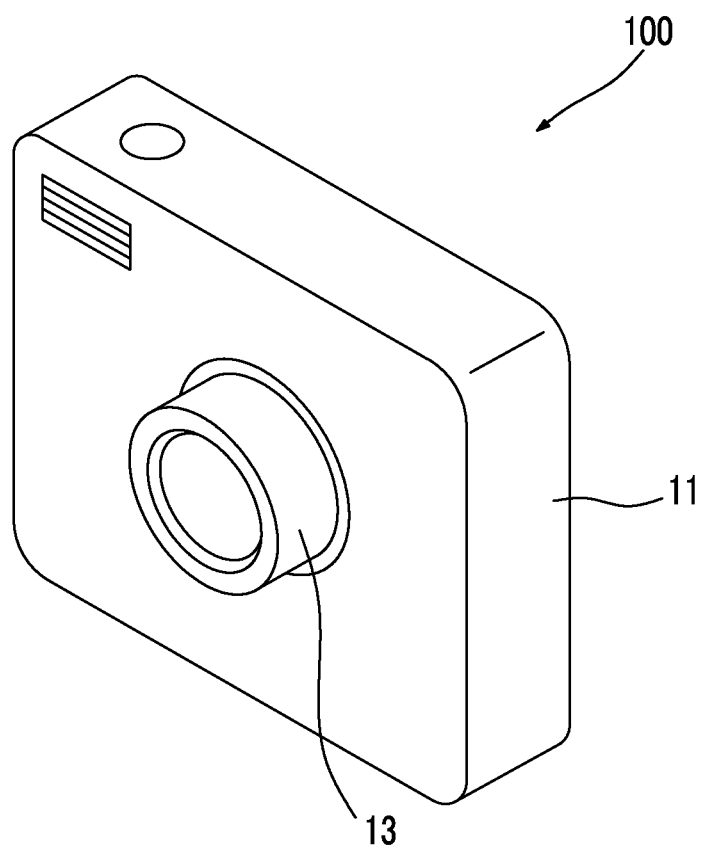
FIG. 1 is a view showing an embodiment of the invention and is a perspective view showing the schematic structure of an imaging device.

FIG. 1 is a view showing an embodiment of the invention and is a perspective view showing the schematic structure of an imaging device.

A digital camera, which is an imaging device 100, includes a camera main body 11 and a lens unit 13 mounted on the camera main body 11. The lens unit 13 is adapted to freely protrude so that the lens unit 13 protrudes outward from the camera main body 11 when performing imaging and is received in the camera main body 11 when not performing imaging. The lens unit 13 may be integrally formed so as to protrude outward from the camera main body 11, and may be a replaceable lens unit that includes a connector allowing the lens unit 13 to be detachably mounted on the camera main body 11.

Figure 2:
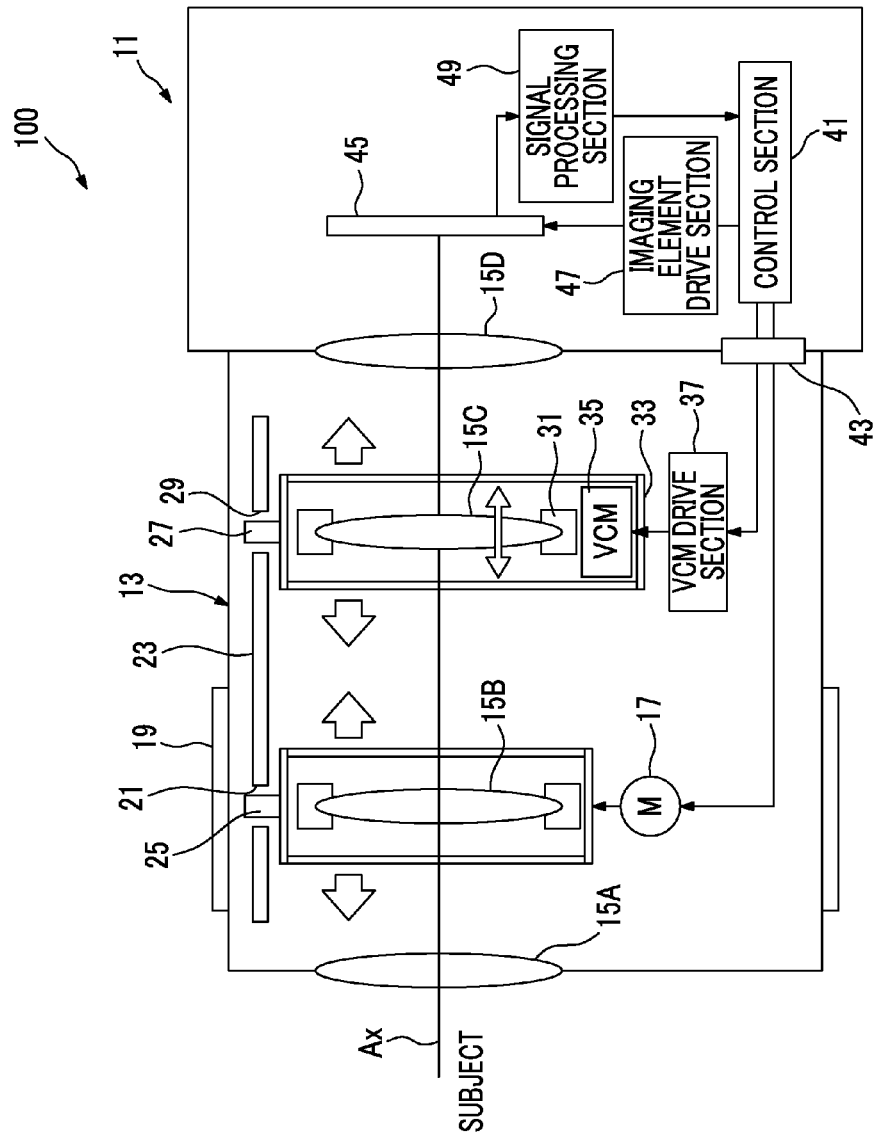
FIG. 2 is a block diagram showing the configuration of the imaging device.

FIG. 2 is a block diagram showing the configuration of the imaging device 100. The lens unit 13 includes: an optical system 15 in which a stationary lens 15A, a zoom lens 15B, a focus lens 15C, and a stationary lens 15D are disposed on a lens axis Ax in this order from a subject; a zoom mechanism that moves the zoom lens 15B and the focus lens 15C along the optical axis Ax; and a focus drive section that moves the focus lens 15C along the optical axis Ax; as main components. Each lens may be formed of a plurality of lenses.

The zoom lens 15B is moved along the optical axis Ax through the driving of a motor 17. Alternatively, when an operator rotates a zoom ring 19, a frame body 23 including a cam groove 21 is rotated and the zoom lens 15B is moved along the optical axis Ax through cam pins 25 that are fixed to the zoom lens 15B and engaged with the cam groove 21.

The frame body 23 includes a cam groove 29 to be engaged with cam pins 27 that are cam engagement portions fixed to the focus lens 15C, and is adapted so that the position of the focus lens 15C in a direction of the optical axis Ax is changed with the movement of the zoom lens 15B.

A lens holder 31 holding the focus lens 15C is supported by a support frame 33, which is disposed on the outer periphery of the lens holder 31, so as to be movable along the optical axis Ax. The cam pins 27 are fixed to the outer peripheral portion of the support frame 33, and the support frame 33 is adapted to be movable along the optical axis Ax through the engagement between the cam pins 27 and the cam groove 29.

A voice coil motor (VCM) 35, which is a lens drive section for focus drive, is provided on the lens holder 31 and the support frame 33. The VCM 35 moves the focus lens 15C relative to the support frame 33 in the optical axis Ax according to an input driving signal.

A VCM drive section 37 outputs a driving signal, which corresponds to a control signal to be input from a control section 41 of the camera main body 11 through a connector 43, to the VCM 35. Further, the control section 41 outputs a driving signal to the above-mentioned motor 17 for zoom drive.

The camera main body 11 is connected to the lens unit 13, and includes an imaging element 45 that picks up the optical image of a subject through the lens unit 13. The driving of the imaging element 45 is controlled by a driving signal that is generated by an imaging element drive section 47 receiving the control signal input from the control section 41. After performing the analog to digital conversion and various kinds of processing on an imaging signal that is output from the imaging element 45, a signal processing section 49 transmits the imaging signal to the control section 41 as picked-up image data.

Next, a specific structure, which drives the focus lens 15C, will be described in detail.

Figure 3:
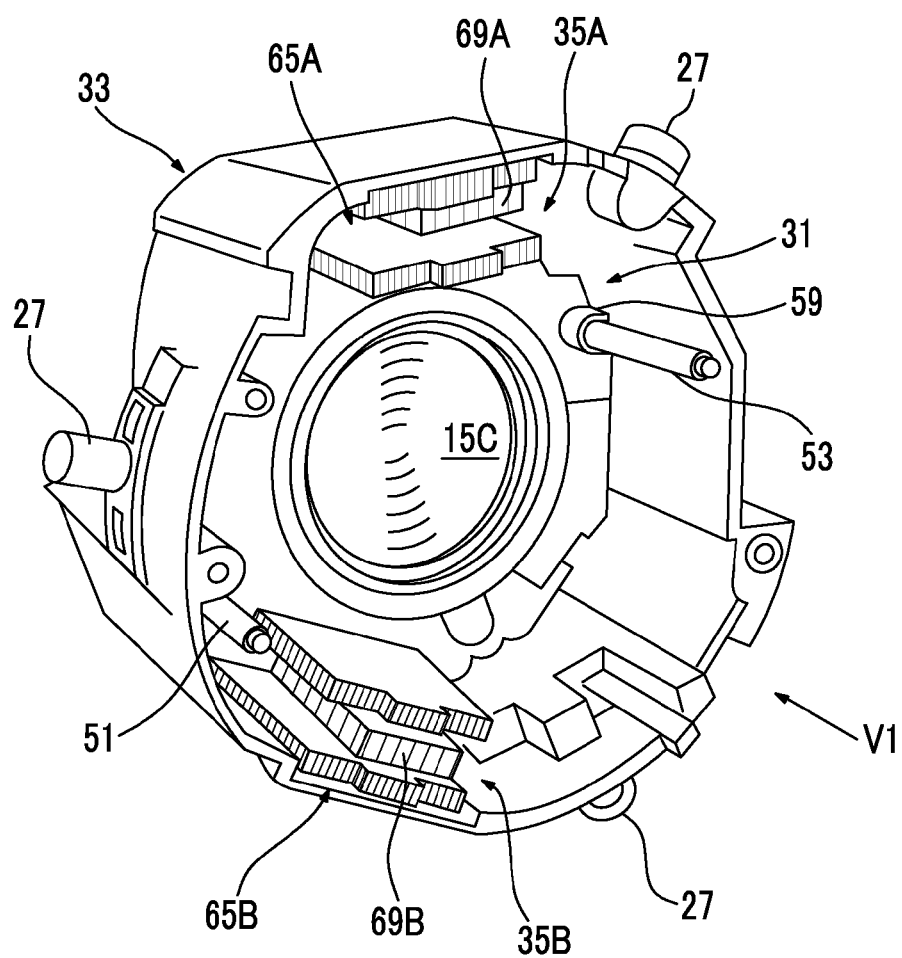
FIG. 3 is a perspective view of a support frame that receives a focus lens, a lens holder, and a VCM.
Figure 4:
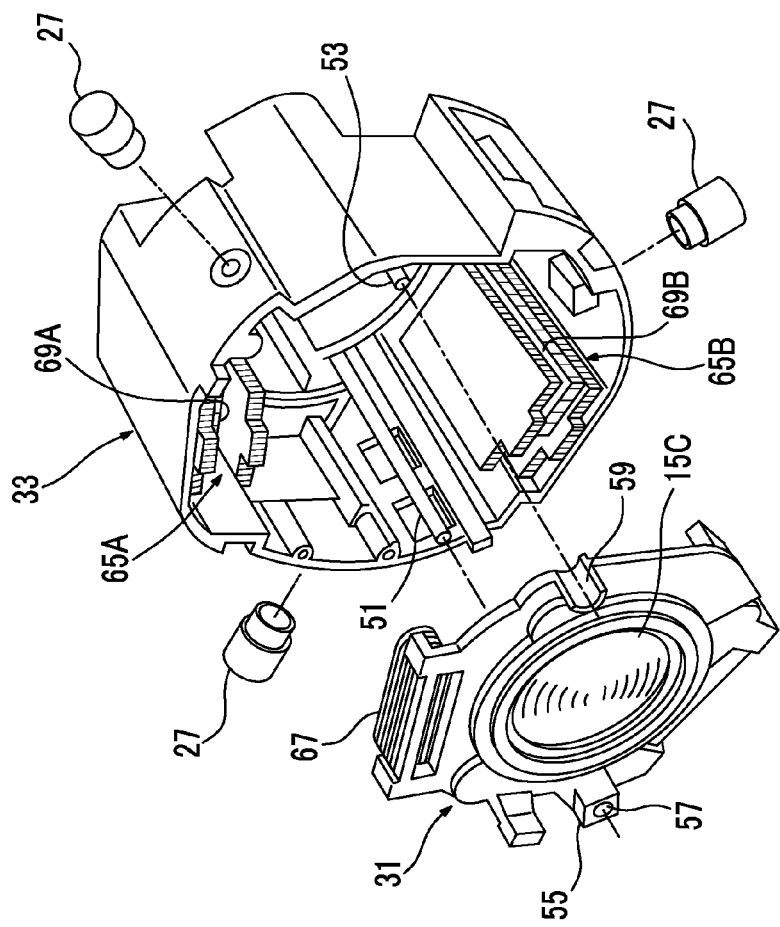
FIG. 4 is an exploded perspective view of the support frame.

FIG. 3 is a perspective view of the support frame 33 that receives the focus lens 15C, the lens holder 31, a VCM 35A, and a VCM 35B, and FIG. 4 is an exploded perspective view of the support frame 33.

As shown in FIGS. 3 and 4, the VCM 35A (first lens drive section) and the VCM 35B (second lens drive section) to be described below in detail are disposed on a part of the inner peripheral side of the support frame 33. The support frame 33 includes a main guide shaft 51 and a sub-guide shaft 53 that are fixed in parallel to the optical axis Ax. The main guide shaft 51 is inserted into an insertion hole 57 of a guide support portion 55 of the lens holder 31 and guides the lens holder 31 along the optical axis Ax. The sub-guide shaft 53 is inserted into a locking portion 59 of the lens holder 31 and functions as a rotation stopper for the lens holder 31.

Figure 5:
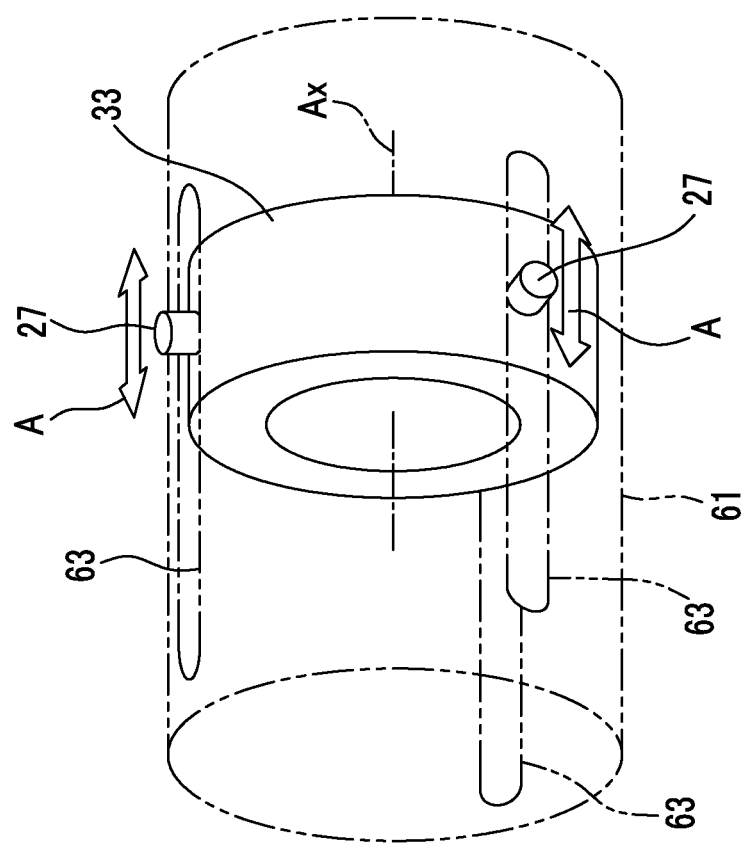
FIG. 5 is a schematic view showing a structure in which the support frame is movably supported in a frame body by cam pins.

The cam pins 27, which are provided on the outer peripheral portion of the support frame 33, are disposed on the support frame 33 at circumferential positions that correspond to three equal angles divided into three from a central angle around the optical axis Ax. FIG. 5 is a schematic view showing a structure in which the support frame 33 is movably supported in the frame body by the cam pins. The respective cam pins 27 protrude outward from the outer peripheral surface of the support frame 33 in a radial direction, are engaged with corresponding cam grooves 63 of a frame body 61 disposed outside the support frame 33, and guide the support frame 33 along the optical axis Ax.

A rotary frame body (not shown) on which cam grooves are formed in a direction inclined with respect to the optical axis Ax and which changes the positions of the cam pins 27 in the direction of the optical axis Ax through rotation is provided on the outer periphery of the frame body 61. When the rotary frame body is rotationally driven through the rotation of the zoom ring shown in FIG. 2, the cam pins 27 engaged with the inclined cam grooves are moved along the linear cam grooves 63 of the frame body 61. Accordingly, the support frame 33 is moved in a straight line along the optical axis Ax.

Next, the specific structure of the VCMs 35A and 35B will be described in detail.

Figure 6:
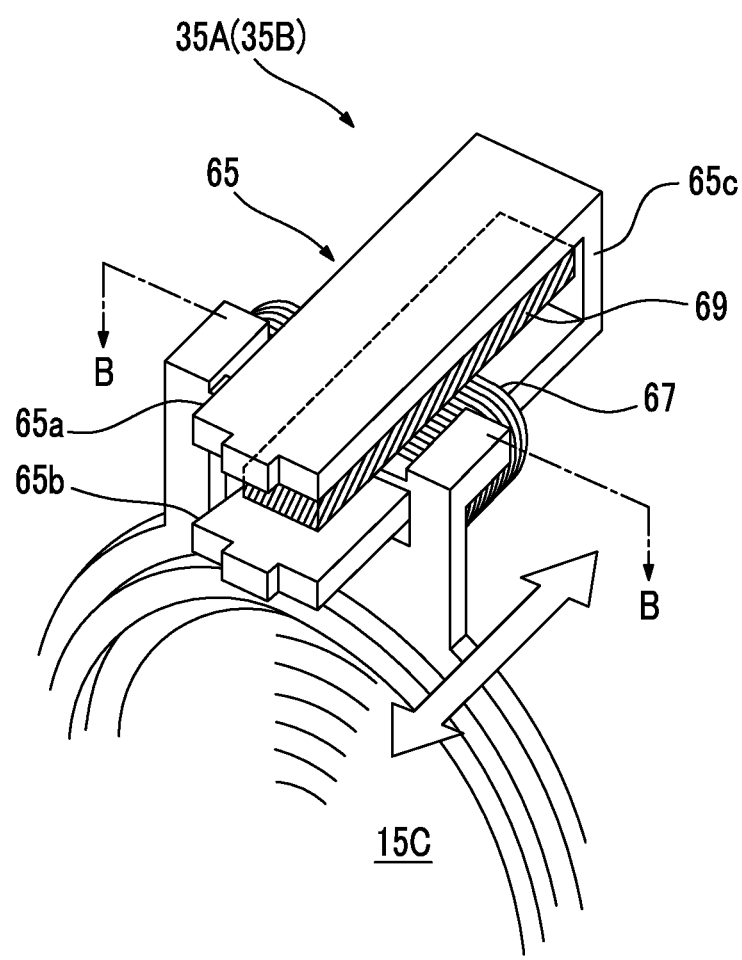
FIG. 6 is a perspective view of main parts of the VCM.
Figure 7:
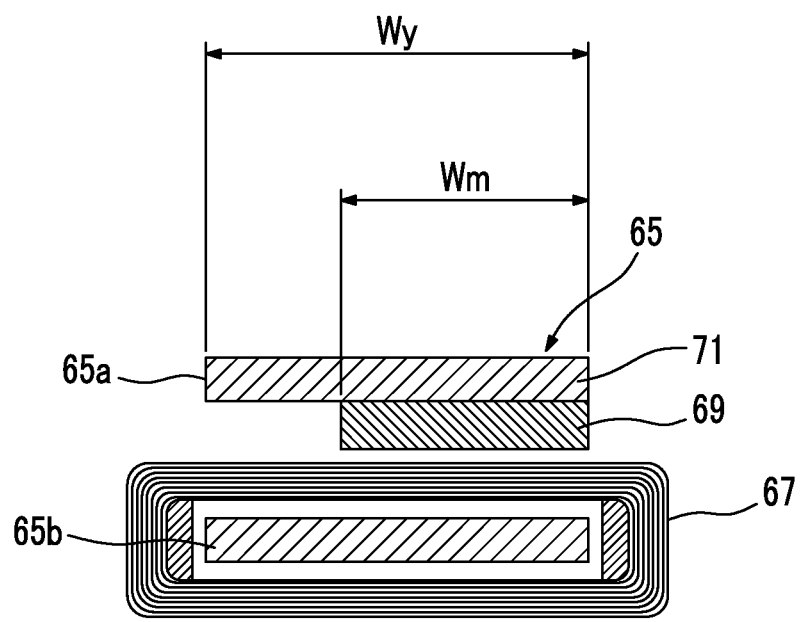
FIG. 7 is a cross-sectional view taken along line B-B of FIG. 6.

FIG. 6 is a perspective view of main parts of the VCM, and FIG. 7 is a cross-sectional view taken along line B-B of FIG. 6.

Since the structure of the VCM 35A is the same as that of the VCM 35B, only the structure of the VCM 35A will be described here. The VCM 35A is provided on the support frame 33 and the lens holder 31 shown in FIGS. 3 and 4. As shown in FIG. 6, the VCM 35A includes a yoke 65 that is fixed to the support frame 33 so that the longitudinal direction of the yoke 65 is parallel to the optical axis Ax, a voice coil 67 that is provided on the lens holder 31 and is fixed so as to face the yoke 65, and a long plate-like magnet 69 that is fixed to the yoke 65.

The yoke 65 includes a first yoke 65*a* and a second yoke 65*b* having the shape of a long plate, and is formed in a U shape as a whole. The magnet 69 is fixed to the surface of the first yoke 65*a*, which faces the voice coil 67, in the longitudinal direction so as to be parallel to the first yoke 65*a*. The second yoke 65*b* is disposed so as to face the first yoke 65*a* with a gap between itself and the magnet 69. These first and second yokes 65*a* and 65*b* are bent at a side end portion 65*c* of a base end and are integrally formed.

An end yoke piece (not shown), which forms an annular yoke by connecting end portions of both the yokes 65*a* and 65*b*, is mounted on an open side that is the other ends of the first and second yokes 65*a* and 65*b* opposite to the side end portion 65*c*. As also shown in FIG. 7, the second yoke 65*b* is inserted into a loop of the voice coil 67 and a part of the loop of the voice coil 67 is disposed in a gap between the magnet 69 and the second yoke 65*b*.

The width Wm of the magnet 69 in a lens circumferential direction is smaller than the width Wy of the first yoke 65*a* in the lens circumferential direction. Further, the magnet 69 is disposed to be biased to a yoke end portion 71 that is one side of the first yoke 65*a* in the lens circumferential direction. It is preferable that a ratio (Wm/Wy) of the width Wm of the magnet to the width Wy of the yoke is in the range of 0.2 to 0.8, and it is particularly preferable that Wm/Wy is in the range of 0.4 to 0.6.

Figure 8:
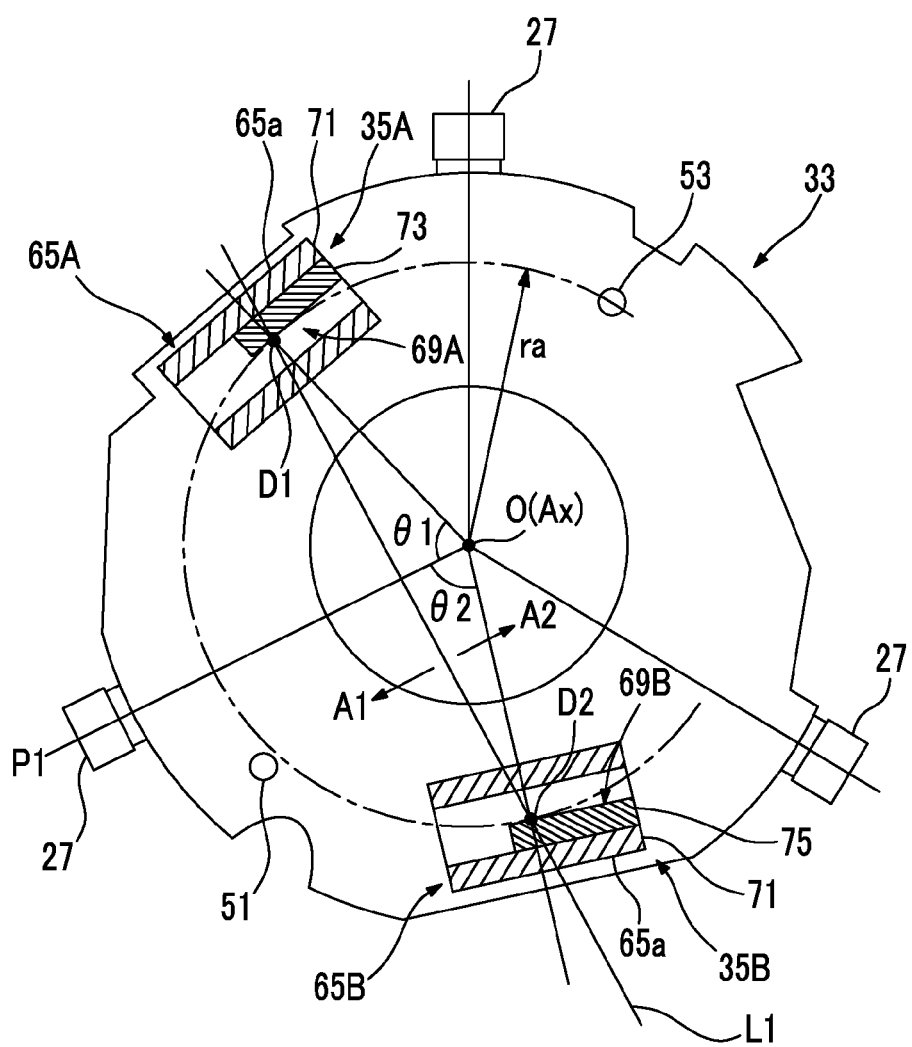
FIG. 8 is a schematic plan view of the support frame that is viewed in a V1 direction of FIG. 3.

FIG. 8 is a schematic plan view of the support frame 33 that is viewed in a V1 direction of FIG. 3.

A yoke 65A and a magnet 69A of the VCM 35A and a yoke 65B and a magnet 69B of the VCM 35B are disposed in the support frame 33. A center position D1 of the yoke 65A (the center position of the lens drive section) and a center position D2 of the yoke 65B (the center position of the lens drive section) on a plane perpendicular to the optical axis Ax are present at positions that are distant from an optical axis center O by the same radial distance ra.

The respective yokes 65A and 65B are disposed at positions line-symmetric with respect to a line P1-O connecting the center of the cam pin 27, which is close to both the yokes 65A and 65B, to the optical axis center O.

Further, each of the plate surfaces of first and second yokes 65*a* and 65*b* of the yoke 65A is perpendicular to a line D1-O, and each of the plate surfaces of the first and second yokes 65*a* and 65*b* of the yoke 65B is perpendicular to a line D2-O. All of the first yoke 65*a* to which the magnet 69A of the yoke 65A is fixed and the first yoke 65*a* to which the magnet 69B of the yoke 65B is fixed are disposed on the outer peripheral side of the corresponding second yokes 65*b* around the optical axis center O.

These VCMs 35A and 35B are disposed at positions where a center point connecting line L1, which connects the center positions D1 and D2 of the shapes of the yokes 65A and 65B on the plane perpendicular to the optical axis Ax, does not pass through the optical axis center (the optical axis Ax) O.

The lens axis Ax is not present on the center point connecting line L1 that connects the center positions D1 and D2. This is caused by the fact that the VCMs 35A and 35B are disposed at positions that do not overlap the cam pins 27 in the direction of the optical axis Ax so as to avoid the cam pins 27 disposed on the frame body 61 at circumferential positions corresponding to three equal angles divided into three from the central angle around the optical axis Ax. Since the VCMs 35A and 35B are disposed so as to avoid the cam pins 27, the support frame can be formed with a space-saving disposition without increasing in size in the direction of the optical axis Ax and the radial direction.

The respective yokes 65A and 65B are disposed at positions where an angle $\theta_1$ formed between the line P1-O and the line D1-O is equal to an angle $\theta_2$ formed between the line P1-O and the line D2-O. $\theta_1$ and $\theta_2$ are preferably in the range of 20° to 100° and more preferably in the range of 30° to 90°.

In this structure, the magnets 69A and 69B are disposed to be biased to the yoke end portions 71 that are end portions of the yokes 65*a* present in a divided area A2, in which the optical axis center O is present, of two divided areas A1 and A2 divided into two from the plane perpendicular to the optical axis Ax by the center point connecting line L1, in the lens circumferential direction, respectively.

That is, the magnet 69A is disposed on the surface of the first yoke 65*a* facing the second yoke 65*b* so that a side surface 73 of the magnet 69A in the longitudinal direction present in the divided area A2 is flush with the yoke end portion 71 forming one end side of the first yoke 65*a*. Likewise, the magnet 69B is also disposed on the surface of the first yoke 65*a* facing the second yoke 65*b* so that a side surface 75 of the magnet 69B in the longitudinal direction present in the divided area A2 is flush with the yoke end portion 71 forming one end side of the first yoke 65*a*.

Meanwhile, the positions of the magnets 69A and 69B are not limited to the positions where the magnets are flush with the above-mentioned yoke end portions 71, and the magnets 69A and 69B have only to be disposed to be biased to the yoke end portions 71 in the lens circumferential direction on the plane perpendicular to the optical axis Ax. For example, each of the side surface 73 of the magnet 69A and the side surface 75 of the magnet 69B may be disposed so as to protrude outward from the yoke end portions 71, or may be disposed so as to be inserted into the yokes.

Figure 9:
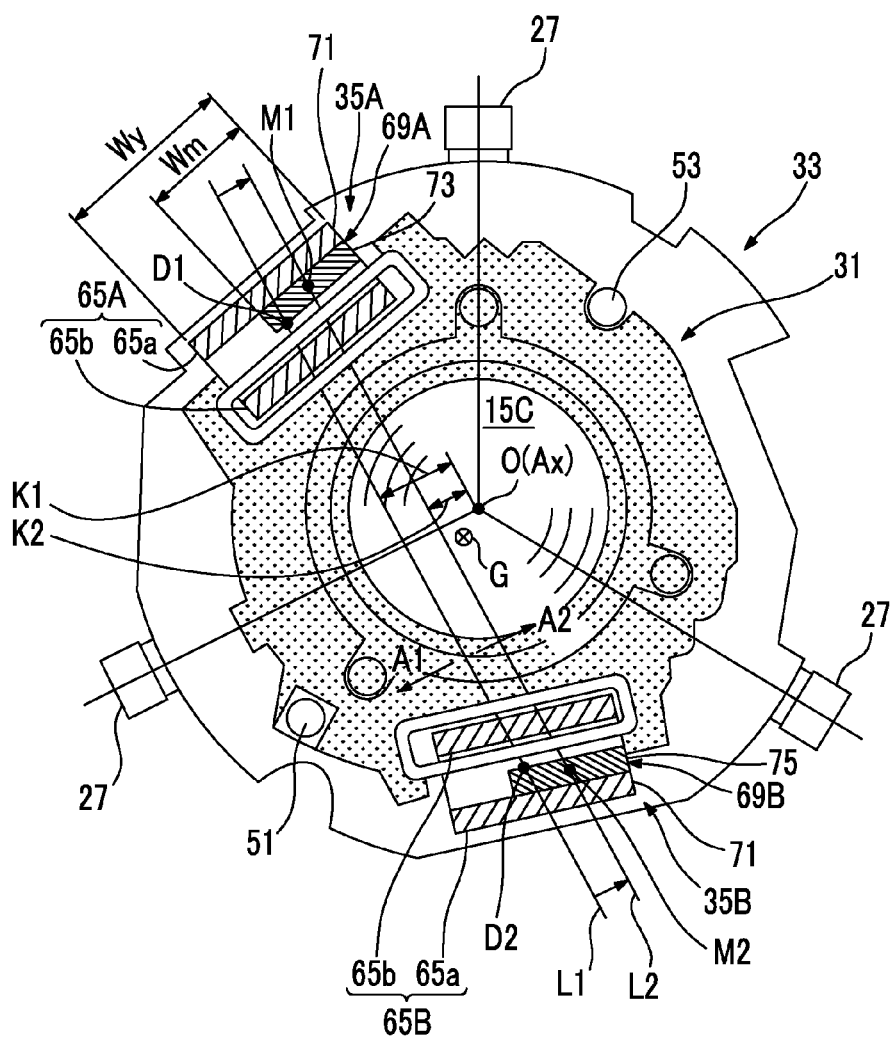
FIG. 9 is a schematic plan view showing a state in which the lens holder is assembled to the support frame shown in FIG. 8.

FIG. 9 is a schematic plan view showing a state in which the lens holder 31 is assembled to the support frame 33 shown in FIG. 8.

A line, which connects a center position M1 of the magnet 69A of the VCM 35A to a center position M2 of the magnet 69B of the VCM 35B on the plane perpendicular to the optical axis Ax as shown in FIG. 9, is referred to as an operating point connecting line L2. The operating point connecting line L2 and the above-mentioned center point connecting line L1 satisfy a relationship in which the shortest distance K2 between the operating point connecting line L2 and the optical axis center O is shorter than the shortest distance K1 between the center point connecting line L1 and the optical axis center O.

That is, since the magnets 69A and 69B are disposed to be biased to the yoke end portions 71 that are provided at end portions of the yokes in the lens circumferential direction, a centroid position G of the entire support frame 33 is moved in a direction close to the optical axis center O. Accordingly, the balance of the weight of the support frame 33 becomes close to the ideal balance of the weight that has a center at the optical axis center O. Further, since the magnets 69A and 69B are biased, an area in which the magnetic flux density of each of the VCMs 35A and 35B is particularly high is also biased and the operating points of magnetic forces generated in voice coils 67A and 67B approach the centroid position G. Accordingly, since the balance of the thrust applied by the VCMs 35A and 35B becomes appropriate, it is possible to smoothly move the lens holder 31 along the optical axis Ax.

Furthermore, in this structure, the yoke 65 and the magnet 69 are disposed in the support frame 33 and the light voice coil 67 is disposed on the lens holder 31. According to this structure, since the movable lens holder 31, which requires to be quickly moved, can be driven with low power and with high responsiveness, a quick focusing operation can be performed.

When this structure is compared with a structure in which the width Wm (see FIG. 7) of the magnet 69 in the lens circumferential direction is the same as the width Wy of the yoke 65, the thrust generated in the voice coil 67 (the lens holder 31) is reduced as the width Wm of the magnet is smaller than the width Wy of the yoke. However, since the amount of the reduced thrust is small, there is hardly an actual influence. Further, since the operating point of the magnetic force applied to the magnet 69 approaches the centroid position of the lens holder 31 when the width Wm of the magnet is reduced, an effect of suppressing the resonance of the voice coil 67 increases. In the entire system, the obtaining of an effect of preventing the resonance of the voice coil 67 is more beneficial than the small loss of thrust.

Furthermore, since the plurality of VCMs 35A and 35B are provided, thrust for driving the lens holder 31 can be efficiently increased. When the lens holder 31 is moved by a single VCM, the VCM needs to be increased in size to obtain thrust from one VCM. In this case, since a space required in the support frame 33 is increased in size, the lens unit increases in size.

In contrast, in a structure in which a plurality of VCMs are disposed so as to be dispersed, each VCM can be reduced in size and each VCM can be disposed with a small space formed in the support frame 33. Accordingly, since a plurality of VCMs are provided, it is possible to move the lens at a high speed without the increase of the size of the lens unit even though the weight of the lens or the lens holder 31 is further increased. Moreover, since a magnetic force as a driving force is applied to a plurality of points, thrust is balanced and the lens can be smoothly moved.

The invention is not limited to the above-mentioned embodiment, and modifications and applications, which are made by those skilled in the art on the basis of the combinations of the respective components of the embodiment, the description of the specification, and well-known techniques, are also expected and included in the claims to be protected.

The drive section for focus drive is described as the drive section in the embodiment. However, the drive section is not limited thereto, and may be a drive section for image stabilization or a drive section for a zoom mechanism, which is formed of a VCM, or the like.

Further, the invention can also be applied to various kinds of imaging devices, such as a video camera, a camera of a small portable electronic device, such as a mobile phone or a smartphone, an on-vehicle camera, and a surveillance camera, other than the above-mentioned digital camera as the imaging device.

The following is disclosed in this specification as described above.

(1) A lens unit including:
a lens;
a lens holder that holds the lens;
a support frame that is provided on an outer periphery of the lens holder and supports the lens holder so as to allow the lens holder to be moved along an optical axis of the lens; and
first and second lens drive sections that move the lens holder along the lens axis in the support frame,
in which the first and second lens drive sections are disposed at positions where a center point connecting line, which connects center positions of the first and second lens drive sections on a plane perpendicular to the lens axis, does not pass through the lens axis,
each of the first and second lens drive sections includes a voice coil motor that includes a yoke fixed to one of the lens holder and the support frame, a voice coil fixed to the other thereof and facing the yoke, and a plate-like magnet fixed to a surface of the yoke facing the voice coil,
the width of the magnet in a lens circumferential direction on the plane perpendicular to the lens axis is smaller than the width of the yoke in the lens circumferential direction,
the magnets are disposed to be biased to end portions of the yokes, which are positioned in a divided area in which the lens axis center is present of divided areas divided into two from the plane perpendicular to the lens axis by the center point connecting line, in the lens circumferential direction, respectively, and
the shortest distance between an operating point connecting line, which connects the center position of the magnet of the first lens drive section to the center position of the magnet of the second lens drive section, and the lens axis on the plane perpendicular to the lens axis is shorter than the shortest distance between the center point connecting line and the lens axis.

(2) The lens unit according to (1), further including:
a frame body that is disposed outside the support frame and includes cam grooves,
in which the support frame includes a plurality of cam engagement portions that protrude outward from an outer peripheral surface of the support frame in a radial direction and are engaged with the cam grooves of the frame body, and
the first and second lens drive sections are disposed at positions that do not overlap the cam engagement portions when viewed in a direction of the lens axis.

(3) The lens unit according to (2),
in which the cam engagement portions are disposed on the support frame at circumferential positions corresponding to three equal angles divided into three from a central angle around the lens axis.

(4) The lens unit according to any one of (1) to (3),
in which the yokes and the magnets are fixed to the support frame, and
the voice coils are fixed to the lens holder.

(5) The lens unit according to any one of (1) to (4),
in which the centers of the first and second lens drive sections on the plane perpendicular to the lens axis are disposed so as to have the same radial distance from the lens axis.

(6) An imaging device including:
the lens unit according to any one of (1) to (5); and
an imaging element that picks up an optical image through the lens.

EXPLANATION OF REFERENCES

11: camera main body
13: lens unit
15C: focus lens
23: frame body
27: cam pin
29: cam groove
31: lens holder
33: support frame
35: voice coil motor (VCM)
45: imaging element
63: cam groove
65, 65A, 65B: yoke
65a: first yoke
65b: second yoke 67, 67A, 67B: voice coil
69, 69A, 69B: magnet
100: imaging device
Ax: optical axis
D1, D2: center position
L1: center point connecting line
L2: operating point connecting line
A1, A2: divided area
Wm: width of magnet
Wy: width of yoke
K1: shortest distance between L1 and O (Ax)
K2: shortest distance between L2 and O (Ax)

What is claimed is:

1. A lens unit comprising:
a lens;
a lens holder that holds the lens;
a support frame that is provided on an outer periphery of the lens holder and supports the lens holder so as to allow the lens holder to be moved along an optical axis of the lens; and
first and second lens drive sections that move the lens holder along the lens axis in the support frame,
wherein the first and second lens drive sections are disposed at positions where a center point connecting line, which connects center positions of the first and second lens drive sections on a plane perpendicular to the lens axis, does not pass through the lens axis,
each of the first and second lens drive sections includes a voice coil motor that includes a yoke fixed to one of the lens holder and the support frame, a voice coil fixed to the other thereof and facing the yoke, and a plate-like magnet fixed to a surface of the yoke facing the voice coil,
the yoke includes a first yoke to which the magnet is fixed and a second yoke that is disposed so as to face the first yoke with a gap between itself and the magnet,
the second yoke is inserted into a loop of the voice coil,
the width of the magnet in a lens circumferential direction on the plane perpendicular to the lens axis is smaller than the width of the yoke in the lens circumferential direction,
the magnets are disposed to be biased to end portions of the yokes, which are positioned in a divided area in which the lens axis center is present of divided areas divided into two from the plane perpendicular to the lens axis by the center point connecting line, in the lens circumferential direction, respectively, and
the shortest distance between an operating point connecting line, which connects the center position of the magnet of the first lens drive section to the center position of the magnet of the second lens drive section, and the lens axis on the plane perpendicular to the lens axis is shorter than the shortest distance between the center point connecting line and the lens axis.

2. The lens unit according to claim 1, further comprising:
a frame body that is disposed outside the support frame and includes cam grooves,
wherein the support frame includes a plurality of cam engagement portions that protrude outward from an outer peripheral surface of the support frame in a radial direction and are engaged with the cam grooves of the frame body, and
the first and second lens drive sections are disposed at positions that do not overlap the cam engagement portions when viewed in a direction of the lens axis.

3. The lens unit according to claim 2,
wherein the cam engagement portions are disposed on the support frame at circumferential positions corresponding to three equal angles divided into three from a central angle around the lens axis.

4. The lens unit according to claim 1,
wherein the yokes and the magnets are fixed to the support frame, and
the voice coils are fixed to the lens holder.

5. The lens unit according to claim 2,
wherein the yokes and the magnets are fixed to the support frame, and
the voice coils are fixed to the lens holder.

6. The lens unit according to claim 3,
wherein the yokes and the magnets are fixed to the support frame, and
the voice coils are fixed to the lens holder.

7. The lens unit according to claim 1,
wherein the centers of the first and second lens drive sections on the plane perpendicular to the lens axis are disposed so as to have the same radial distance from the lens axis.

8. The lens unit according to claim 2,
wherein the centers of the first and second lens drive sections on the plane perpendicular to the lens axis are disposed so as to have the same radial distance from the lens axis.

9. The lens unit according to claim 3,
wherein the centers of the first and second lens drive sections on the plane perpendicular to the lens axis are disposed so as to have the same radial distance from the lens axis.

10. The lens unit according to claim 4,
wherein the centers of the first and second lens drive sections on the plane perpendicular to the lens axis are disposed so as to have the same radial distance from the lens axis.

11. The lens unit according to claim 5,
wherein the centers of the first and second lens drive sections on the plane perpendicular to the lens axis are disposed so as to have the same radial distance from the lens axis.

12. The lens unit according to claim 6,
wherein the centers of the first and second lens drive sections on the plane perpendicular to the lens axis are disposed so as to have the same radial distance from the lens axis.

13. An imaging device comprising:
the lens unit according to claim 1; and
an imaging element that picks up an optical image through the lens.

14. An imaging device comprising:
the lens unit according to claim 2; and
an imaging element that picks up an optical image through the lens.

15. An imaging device comprising:
the lens unit according to claim 3; and
an imaging element that picks up an optical image through the lens.

16. An imaging device comprising:
the lens unit according to claim 4; and
an imaging element that picks up an optical image through the lens.

17. An imaging device comprising:
the lens unit according to claim 5; and
an imaging element that picks up an optical image through the lens.

18. An imaging device comprising:
the lens unit according to claim 6; and
an imaging element that picks up an optical image through the lens.

19. An imaging device comprising:
the lens unit according to claim 7; and
an imaging element that picks up an optical image through the lens.

20. An imaging device comprising:
the lens unit according to claim 8; and
an imaging element that picks up an optical image through the lens.

\* \* \* \* \*